(12) United States Patent
Mochizuki

(10) Patent No.: US 10,063,807 B2
(45) Date of Patent: Aug. 28, 2018

(54) IMAGE PROCESSING APPARATUS AND IMAGE PROCESSING METHOD WITH CONTROLLING OF OUTPUT RATES FROM ENCODERS TO MEMORY

(71) Applicant: CANON KABUSHIKI KAISHA, Tokyo (JP)

(72) Inventor: Shigeki Mochizuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/299,501

(22) Filed: Oct. 21, 2016

(65) Prior Publication Data

US 2017/0127015 A1 May 4, 2017

(30) Foreign Application Priority Data

Oct. 30, 2015 (JP) .................. 2015-214806

(51) Int. Cl.
| | | |
|---|---|---|
| *H04N 7/01* | (2006.01) | |
| *H04N 1/60* | (2006.01) | |
| *H04N 19/60* | (2014.01) | |
| *G06T 1/20* | (2006.01) | |
| *G06T 1/60* | (2006.01) | |

(52) U.S. Cl.
CPC ............. *H04N 7/0127* (2013.01); *G06T 1/20* (2013.01); *G06T 1/60* (2013.01); *H04N 1/6027* (2013.01); *H04N 19/60* (2014.11)

(58) Field of Classification Search
CPC .... H04N 7/0127; H04N 19/60; H04N 1/6027; G06T 1/60; G06T 1/20

USPC ........................................ 348/222.1
See application file for complete search history.

(56) References Cited

U.S. PATENT DOCUMENTS

| | | | | |
|---|---|---|---|---|
| 2007/0005795 A1* | 1/2007 | Gonzalez | .......... | G06F 17/30017 709/232 |
| 2009/0066808 A1* | 3/2009 | Kurokawa | ............. | H04N 5/772 348/231.2 |
| 2009/0244307 A1* | 10/2009 | Nagaishi | ................ | H04N 5/335 348/222.1 |

FOREIGN PATENT DOCUMENTS

JP     2003-132007     5/2003

* cited by examiner

*Primary Examiner* — Lin Ye
*Assistant Examiner* — Chan T Nguyen
(74) *Attorney, Agent, or Firm* — Fitzpatrick, Cella, Harper & Scinto

(57) ABSTRACT

In an image processing apparatus and an image processing method for encoding image data in parallel with each other with a plurality of encoding units, the output rates of the encoding units can be dynamically controlled. The image data is converted to a plurality of pixel planes, and the plurality of encoding units 103c encode the pixel planes. An output rate control unit 103d controls the output rates to a shared memory from the plurality of encoding units 103c by controlling an access request that is to be output to a memory I/F unit 105, in accordance with at least one of a pixel plane conversion mode and available capacities of buffers 103b.

9 Claims, 9 Drawing Sheets

FIG. 2

| R | G1 | R | G1 |
|---|----|---|----|
| G2 | B | G2 | B |
| R | G1 | R | G1 |
| G2 | B | G2 | B |

BAYER PATTERN (R/G1/G2/B)

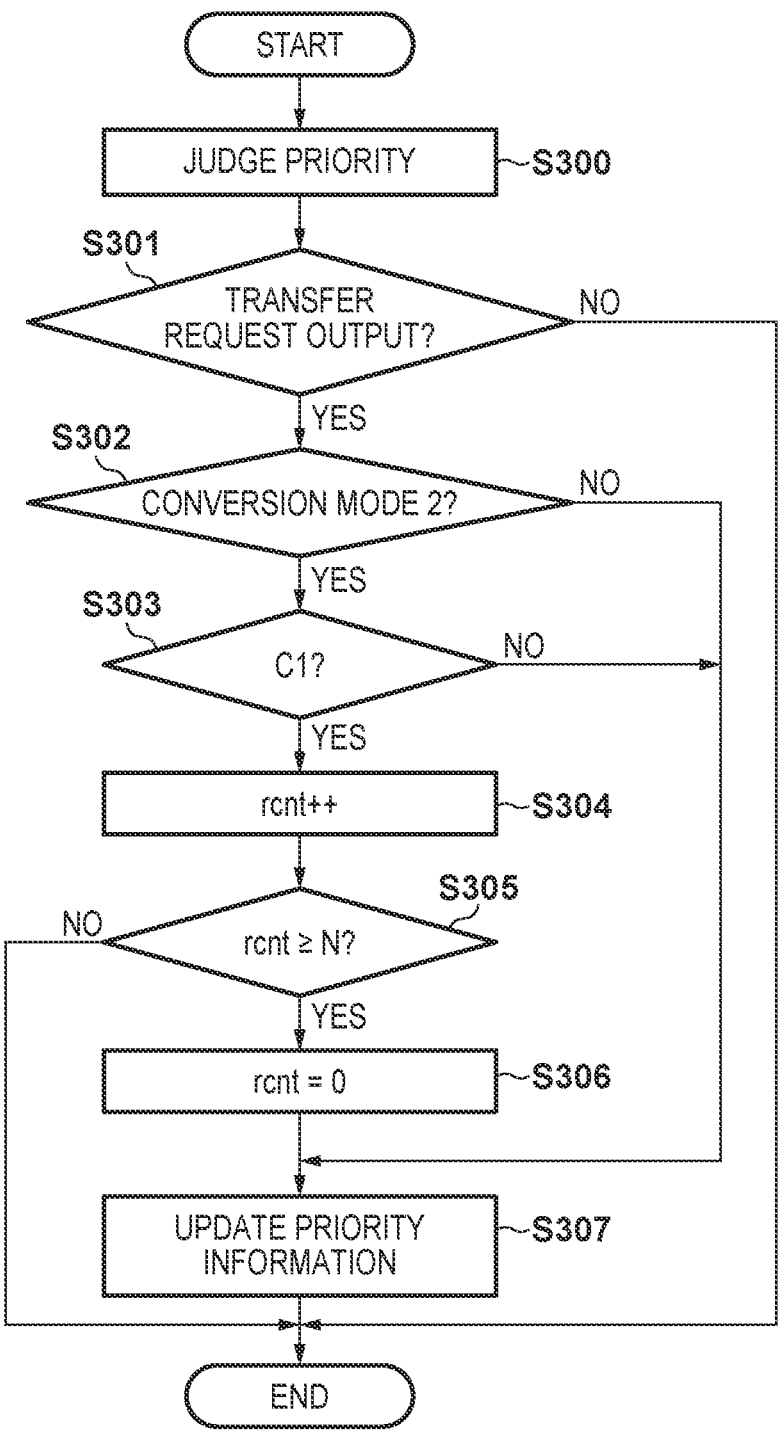

IMAGE PROCESSING APPARATUS AND IMAGE PROCESSING METHOD WITH CONTROLLING OF OUTPUT RATES FROM ENCODERS TO MEMORY

BACKGROUND OF THE INVENTION

Field of the Invention

The present invention relates to an image processing apparatus and an image processing method, and in particular to a technique for encoding an image.

Description of the Related Art

A single plane image sensor provided with a color filter is used in a general digital camera. Also, the primary color Bayer pattern shown in FIG. 2 is known as one color distribution pattern of a color filter provided in the single plane image sensor. R (red), G1 (green), G2 (green), and B (blue) are periodically arranged, 2×2 pixels being one unit, in the primary color Bayer pattern. Because human vision is more sensitive to the luminance component than the color components, green pixels containing a larger luminance component than a red or blue pixel are arranged in a greater number than the red and blue pixels.

A signal that has been read out from the single plane image sensor has one color component per pixel. Such a signal format is called the RAW format, and RAW format data is called RAW data. Also, a signal obtained by classifying the signals of all of the pixels in terms of the corresponding color filter is called a pixel plane. If a color filter with the primary color Bayer pattern is used, the pixel signals are classified into an R plane, a G1 plane, a G2 plane, and a B plane. The pixel plane is also called a color plane, or a component.

Because RAW data has a large data amount, if the RAW data is recorded or transmitted, it has been known that the RAW data is encoded in order to reduce the data amount. In this case, in order to shorten the processing time, as with an encoder 800 shown in FIG. 8, for example, a configuration is possible in which a component converter 801 that separates the RAW data into pixel planes is provided, and four encoding units 802 encode respective pixel planes. For example, in the case of RAW data with the primary color Bayer pattern, the component converter 801 separates the RAW data into an R plane (C1), a G1 plane (C2), a G2 plane (C3), and a B plane (C4). The encoding units 802 respectively encode one pixel plane and output encoded data.

If the outputs of the four encoders 802 are connected to a shared data bus, in order to utilize the capability of the individual encoding units 802 to a maximum, it is important to allocate an appropriate output rate to the individual encoding unit 802 in accordance with the amount of encoded data that is to be generated. Japanese Patent Laid-Open No. 2003-132007 discloses a method for, in a digital camera in which a plurality of processing modules share a data bus, setting and managing timing and length of a time period during which the data bus can be used by each processing module.

The amount of encoded data generated in the individual encoding unit 802 may change depending on the type of signal that the encoding unit 802 encodes, the operation mode of the encoding unit, and the like, and thus it is important to dynamically control the rate of outputting the encoded data. However, in the method disclosed in Japanese Patent Laid-Open No. 2003-132007, the timing and the length of a time period during which the data bus can be used are fixed for each module, and thus the output rate of the module cannot be dynamically controlled. Therefore, the encode amount may be too high or too low in the allocated time period, and the encoding efficiency decreases.

SUMMARY OF THE INVENTION

The present invention has been made in light of such issues in the related art. The present invention provides an image processing apparatus and an image processing method that can dynamically control the output rates of a plurality of encoding units when the encoding units encode pieces of image data in parallel with each other.

According to one aspect of the present invention, there is provided an image processing apparatus comprising: a conversion unit configured to convert image data to a plurality of pixel planes; a plurality of first storage units configured to respectively store one of the plurality of pixel planes; a plurality of encoding units configured to respectively encode a pixel plane stored in a corresponding one of the plurality of first storage units; a rate control unit configured to control output rates from the plurality of encoding units to a second storage unit; and an access control unit configured to grant an access request for access to the second storage unit, wherein the rate control unit controls the output rates by controlling an access request that is to be output to the access control unit among access requests to the second storage unit from the plurality of encoding units, in accordance with a conversion mode of the conversion unit and/or available capacities of the first storage units.

According to another aspect of the present invention, there is provided an image capture apparatus comprising: an image sensor; a conversion unit configured to convert image data obtained by the image sensor to a plurality of pixel planes; a plurality of first storage units configured to respectively store one of the plurality of pixel planes; a plurality of encoding units configured to respectively encode a pixel plane stored in a corresponding one of the plurality of first storage units; a rate control unit configured to control output rates from the plurality of encoding units to a second storage unit; and an access control unit configured to grant an access request for access to the second storage unit, wherein the rate control unit controls the output rates by controlling an access request that is to be output to the access control unit among access requests to the second storage unit from the plurality of encoding units, in accordance with a conversion mode of the conversion unit and/or available capacities of the first storage units.

According to still another aspect of the present invention, there is provided an image processing method executed by an image processing apparatus that comprises: a conversion unit configured to convert image data to a plurality of pixel planes; a plurality of first storage units configured to respectively store one of the plurality of pixel planes; a plurality of encoding units configured to respectively encode a pixel plane stored in a corresponding one of the plurality of first storage units; a second storage unit shared by the plurality of encoding units; and an access control unit configured to grant an access request for access to the second storage unit, the method comprising: controlling the output rates from the plurality of encoding units to the second storage unit, by controlling an access request that is to be output to the access control unit among access requests to the second storage unit from the plurality of encoding units, in accordance with a conversion mode of the conversion unit and/or available capacities of the first storage units.

According to yet another aspect of the present invention, there is provided a non-transitory computer-readable storage medium storing a program for causing a computer to function as an image processing apparatus comprising: a conversion unit configured to convert image data to a plurality of pixel planes; a plurality of first storage units configured to respectively store one of the plurality of pixel planes; a plurality of encoding units configured to respectively encode a pixel plane stored in a corresponding one of the plurality of first storage units; a rate control unit configured to control output rates from the plurality of encoding units to a second storage unit; and an access control unit configured to grant an access request for access to the second storage unit, wherein the rate control unit controls the output rates by controlling an access request that is to be output to the access control unit among access requests to the second storage unit from the plurality of encoding units, in accordance with a conversion mode of the conversion unit and/or available capacities of the first storage units.

Further features of the present invention will become apparent from the following description of exemplary embodiments with reference to the attached drawings.

BRIEF DESCRIPTION OF THE DRAWINGS

FIG. 2 is a schematic diagram showing a configuration of RAW data in a primary color Bayer pattern.

FIG. 3 is a flowchart for illustrating the control of an output rate in a first embodiment.

DESCRIPTION OF THE EMBODIMENTS

Exemplary embodiments of the present invention will now be described in detail in accordance with the accompanying drawings. Note that although a configuration in which the present invention is applied to an image capture apparatus that is an example of an image processing apparatus will be described in an embodiment described below, the configuration related to image capture is not essential for the present invention. For example, a configuration is possible in which image data that has been already recorded as a data file in any format is acquired from a storage apparatus or an external apparatus. Also, RAW data is an example of pieces of image data that are suitable for undergoing encoding processing in parallel with each other.

First Embodiment

Figure 1A:
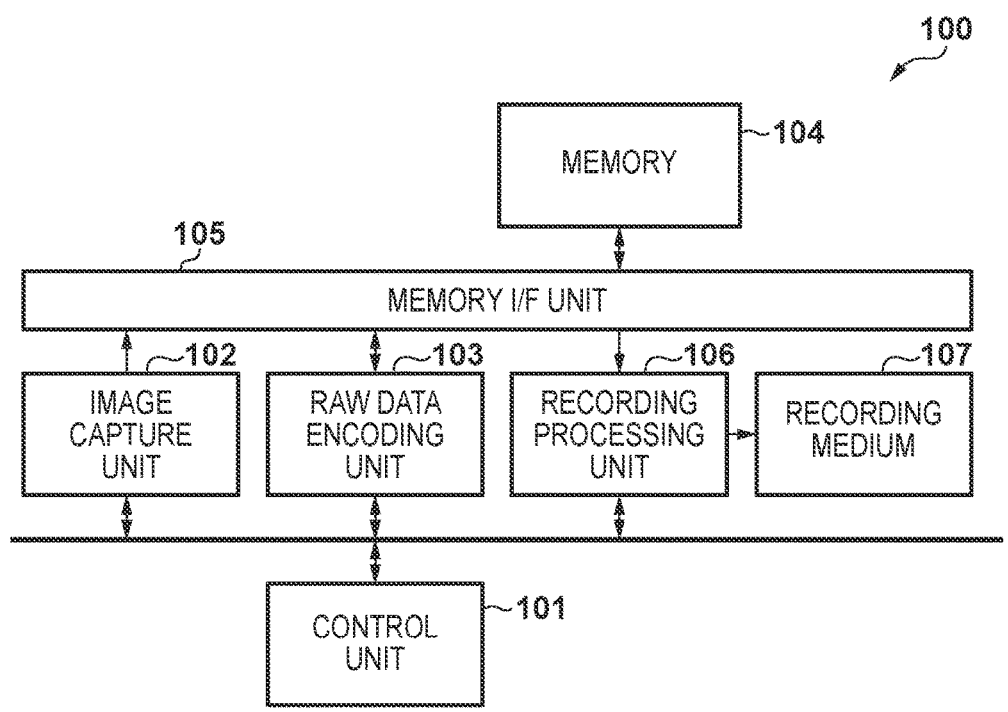
FIGS. 1A and 1B are block diagrams showing a functional configuration example of an image capture apparatus as an exemplary image processing apparatus according to an embodiment.

FIG. 1A is a block diagram schematically showing a functional configuration example of an image capture apparatus 100 according to a first embodiment, the functional configuration example related to encoding of RAW data.

A control unit 101 includes a programmable processor such as a CPU, a non-volatile memory such as a ROM that stores a program executed by the CPU, and a volatile memory such as a RAM for loading a program when the program is executed, for example. Then, operations of blocks of the image capture apparatus 100 are controlled and the function of the image capture apparatus 100 that includes encoding processing that will be described later is realized by the CPU executing the program.

An image capture unit 102 includes an imaging optical system and an image sensor, photoelectrically converts an optical image of a subject that is formed by the imaging optical system on the imaging plane using a plurality of pixels that are arranged in the image sensor, and outputs an image signal corresponding to the optical image. The control unit 101 sets shooting conditions and performs exposure control in the image capture unit 102. The imaging optical system includes movable members such as a focus lens, a variable magnification lens, and a diaphragm, a motor for driving them, and the like. The image sensor is a CCD or CMOS image sensor, for example. Also, the image capture unit 102 has an A/D conversion function and converts an image signal into a digital format. Note that the image sensor may have the A/D conversion function. The image signal that is read out from the image sensor and converted into the digital format is RAW data including one color component per pixel. The image capture unit 102 writes the RAW data on a memory 104 through a memory I/F unit 105.

In the present embodiment, it is assumed that the image sensor has a color filter having the primary color Bayer pattern that has repetitive units constituted by four subfilters of R (red), G1 (green), G2 (green), and B (blue), which are shown in FIG. 2. Note that the image sensor may include a color filter having another color distribution or other color components.

A RAW data encoding unit 103 reads out the RAW data that is stored in the memory 104 and has the primary color Bayer pattern, encodes the RAW data in parallel for each pixel plane, and again writes the generated encoded data to the memory 104. The configuration and operations of the RAW data encoding unit 103 will be described in detail later.

The memory 104 is a storage area for storing various types of data that is output from units of the image capture apparatus 100, the memory 104 being constituted by a volatile memory, for example, and is a storage area (a shared resource) that is shared by a plurality of encoding units of the RAW data encoding unit 103.

The memory I/F unit 105 arbitrates access requests for the memory 104 from the units (including the plurality of encoding units) of the image capture apparatus 100, and controls access (readout and writing) to the memory 104. In the present embodiment, upon receiving an access request for the memory 104 from the RAW data encoding unit 103 (an output rate control unit 103d), the memory I/F unit 105 outputs to the RAW data encoding unit 103 a grant signal for granting the access to the memory 104 for a fixed time period.

A recording processing unit 106 reads out the encoded data stored in the memory 104, and records the encoded data to a recording medium 107 that is a semiconductor memory card, for example, in a predetermined recording format.

Figure 1B:
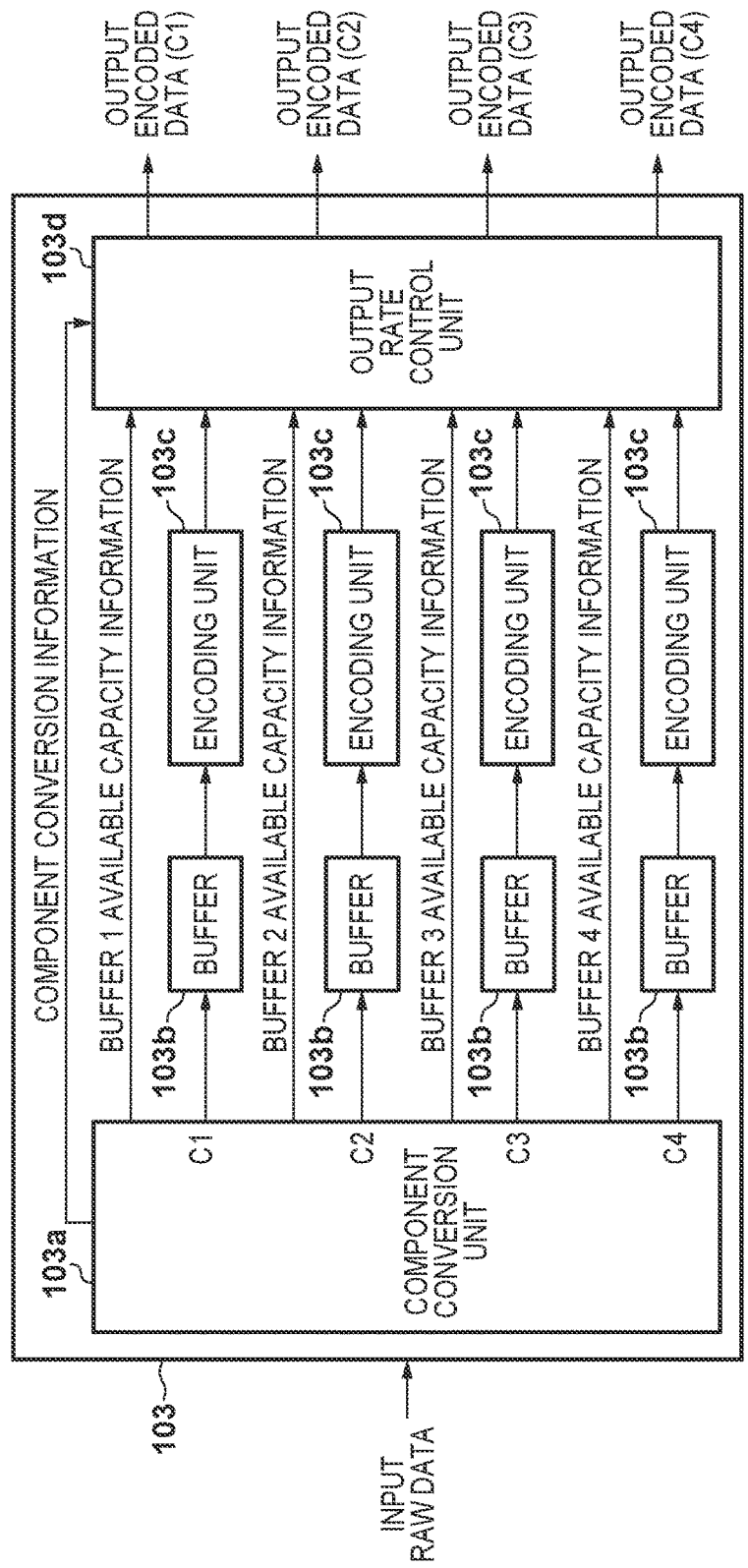

FIG. 1B is a block diagram schematically showing a functional configuration example of the RAW data encoding unit 103.

A component conversion unit 103a classifies pixel signals constituting the RAW data into subfilters (R, G1, G2, and B) that are included in the repetitive units of the color filter, and converts the image signals to four pixel planes (C1 to C4). Four buffers 103b each store a different one of the four pixel planes. Four encoding units 103c encode the pixel planes stored in the corresponding buffers 103b with a predetermined method, and output encoded data. An output rate control unit 103d controls the rates of outputting pieces of the encoded data that are output from the encoding units 103c. Hereinafter, the operations of the units will be described in more detail.

The component conversion unit 103a has a conversion mode 1 in which R, G1, G2, and B signals obtained by classifying the RAW data are used as the pixel planes without changing the format, and a conversion mode 2 in which the R, G1, G2, and B signals are converted to a signal format expressing a luminance component and another component (a color difference component, for example), and used as the pixel planes. The conversion mode can be dynamically changed by setting of the control unit 101, for example. The setting of the conversion mode may be based on an instruction given from a user, may be based on an operation mode of the apparatus, such as a shooting mode, or may be based on other information. In the conversion mode 2, the G1 signal and G2 signal can be converted to a low frequency component GL and a high frequency component GH of a G signal by Haar conversion, for example, and the three R, GL, and B signal components can be converted based on Equation 1 below (a, b, c, d, and e are transformation coefficients that have been determined in advance).

$$D1 = a \times R + b \times GL + c \times B$$

$$D2 = d \times (B - D1)$$

$$D3 = e \times (R - D1) \qquad \text{Equation 1}$$

Note that this is an example, and another method may be executed in the conversion mode 2.

Note that it is assumed that the component conversion unit 103a of the present embodiment allocates the R, G1, G2, and B signals to the pixel plane C1 to C4 in each conversion mode as follows.
Conversion Mode 1
 (C1, C2, C3, C4)=(R, G1, G2, B)
Conversion Mode 2
 (C1, C2, C3, C4)=(D1, D2, D3, GH)

The component conversion unit 103a writes the pixel planes to the corresponding buffers 103b. Also, the component conversion unit 103a calculates the available capacity of each buffer 103b from the write address that it uses for the buffer 103b and the read address that the encoding unit 103c uses for the buffer 103b, and outputs the available capacity to the output rate control unit 103d.

The encoding units 103c read out and encode the pixel planes stored in the corresponding buffers 103b, and generate encoded data. Also, the encoding units 103c output access requests for writing the generated encoded data to the memory 104 (hereinafter, referred to as transfer requests) to the output rate control unit 103d, and output the encoded data to the output rate control unit 103d if the transfer request is granted. Note that there is no particular limitation on the method by which the encoding units 103c performing encoding, and known lossless or lossy encoding can be applied. An example may be a combination of processing for conversion to frequency components using wavelet conversion, discrete cosine conversion, or the like, processing for quantizing the conversion result (transformation coefficient), variable-length encoding such as Golomb encoding, Huffman encoding, or arithmetic encoding performed on the quantization result.

In the present embodiment, if the component conversion unit 103a is operating in the conversion mode 1, encode amount control is executed so as to uniformize the encode amounts that the encoding units 103c generate for the pixel planes (R, G1, G2, and B). This can be realized by setting the same target amount for the generated encode amounts in the encoding units 103c. For example, encode amount control can be performed such that the ratio of generated encode amount targets for the pixel planes R, G1, G2, and B is 1:1:1:1.

If the component conversion unit 103a is operating in the conversion mode 2, the encoding target pixel planes are the pixel plane D1 (C1) including a large amount of the luminance component, and the other pixel planes D2, D3, and GH (C2-C4). Therefore, the encode amount control is executed on the pixel plane D1 that has a high visual importance and contains a large amount of the luminance component, such that a larger output rate (large generated encode amount) than the other pixel planes are granted. This can be realized by making the target amount for the generated encode amount that is set in the encoding unit 103c corresponding to the pixel plane D1 larger than the target value for the generated encode amount that is set in the encoding units 103c corresponding to the other pixel planes D2, D3, and GH, for example. For example, encode amount control can be performed such that the ratio of generated encode amount targets for the pixel planes D1, D2, D3, and GH is 3:1:1:1 or 3:1:1:2.

It is assumed that a relationship (or the allocated encoded data amount) between generated encode amount targets for pixel planes (or encoding units corresponding to the pixel planes) corresponding to the conversion mode is defined in advance, and known to the output rate control unit 103d. Therefore, the output rate control unit 103d can dynamically control the output rates for the plurality of encoding units 103c by acquiring information indicating which conversion mode the component conversion unit 103a is operating in, from the component conversion unit 103a.

The output rate control unit 103d judges priorities for transfer requests respectively made by the encoding units 103c, based on priority information that is held by the output rate control unit 103d, and outputs the transfer request that the output rate control unit 103d has judged to have the highest priority, to the memory I/F unit 105. Because the memory I/F unit 105 grants access to the memory 104 to the transfer request source, the output rate control unit 103d can control the rate of output to the memory 104 for each encoding unit 103c by the output rate control unit 103d selecting the transfer request output to the memory I/F unit 105.

In the present embodiment, the rate for outputting the encoded data is dynamically controlled by updating the priority information held by the output rate control unit 103d with different methods in accordance with the conversion mode of the component conversion unit 103a. Hereinafter, the output rate control method (priority information update method) of the present embodiment will be described based on the flowchart shown in FIG. 3. Note that the processing shown in FIG. 3 is executed repeatedly at a predetermined frequency.

First, the output rate control unit 103d judges the priority of the transfer request that has been input from the encoding unit 103c, based on the priority information (step S300). Here, if there are no transfer requests whose priority needs to be judged, the output rate control unit 103d ends the processing (step S301, NO). On the other hand, if there is a transfer request whose priority needs to be judged, the output rate control unit 103d outputs the transfer request that has been judged to have the highest priority among the transfer requests, to the memory I/F unit 105 (step S301, YES), and advances the processing to step S302.

Next, the output rate control unit 103d judges whether or not the component conversion unit 103a is operating in the conversion mode 2 (step S302), and if it is judged that the component conversion unit 103a is operating in the conversion mode 2, the output rate control unit 103d advances the processing to step S303. Also, if it is not judged that the component conversion unit 103a is operating in the conversion mode 2 (it is judged that the component conversion unit 103a is operating in the conversion mode 1), the output rate control unit 103d advances the processing to step S307, and updates the priority information. In this case, the output rate control unit 103d changes the priority of the encoding unit 103c, which is the transfer request source that has made the transfer request that was output to the memory I/F unit 105 in step S301, to the lowest in step S307, and updates the priority information by increasing the priorities of the remaining encoding units 103c by one each. Note that the priorities may be associated with the corresponding pixel planes instead of the encoding units 103c. When the priority information is updated, the output rate control unit 103d ends the processing.

On the other hand, if it is judged that the component conversion unit 103a is operating in the conversion mode 2, in step S303, the output rate control unit 103d judges whether or not the transfer request that has been output to the memory I/F unit 105 is from the encoding unit 103c related to a predetermined pixel plane. If it is judged that the transfer request that has been output to the memory I/F unit 105 is from the encoding unit 103c related to the predetermined pixel plane, the output rate control unit 103d advances the processing to step S304, and if this judgment is not made, advances the processing to step S307.

In the present embodiment, the output rate control unit 103d judges whether or not the transfer request that has been output to the memory I/F unit 105 is a transfer request that is associated with the pixel plane C1 and is from the encoding unit 103c. In the conversion mode 2, the D1 signal containing a large amount of the luminance component is allocated to the pixel plane C1. Thus, the judgment in step S303 in the present embodiment may be a judgment about whether or not the transfer request that has been output to the memory I/F unit 105 is the transfer request related to the signal containing a large amount of the luminance component.

If it is not judged that the transfer request that has been output to the memory I/F unit 105 is from the encoding unit 103c related to a predetermined pixel plane, similarly to the case of the conversion mode 1, the output rate control unit 103d updates the priority information in step S307. That is, the output rate control unit 103d changes the priority of the encoding unit 103c, which is the request source that output the transfer request to the memory I/F unit 105 in step S301, to the lowest, and updates the priority information by increasing the priorities of the remaining encoding units 103c by one each.

If it is judged that the transfer request that has been output to the memory I/F unit 105 is from the encoding unit 103c related to the predetermined pixel plane, in step S304, the output rate control unit 103d increments a counter rcnt. The counter rcnt may be a variable held in a memory built into the output rate control unit 103d, for example, and the initial value of the counter rcnt is 0. Note that the value of the counter rcnt indicates the number of times that the transfer request for the predetermined pixel plane has been output to the memory I/F unit 105.

In step S305, the output rate control unit 103d judges whether the value of the counter rcnt is a predetermined value N (N is an integer of 1 or more) or more, and if it is judged that the value of the counter rcnt is N or more, the output rate control unit 103d advances the processing to step S306, whereas if it is not judged that the counter rcnt is N or more (in the case of less than N), ends the processing without changing the priority information.

The output rate control unit 103d initializes the value of the counter rcnt to 0 in step S306, and updates the priority information in step S307. Here as well, the output rate control unit 103d changes the priority of the encoding unit 103c, which is the request source that has output the transfer request to the memory I/F unit 105 in step S301, to the lowest, and updates the priority information by increasing the priorities of the remaining encoding units 103c by one each.

That is, in the present embodiment, regardless of the conversion mode of the component conversion unit 103a, the priority of the encoding unit 103c, which is the request source that outputs the transfer request to the memory I/F unit 105, is changed to the lowest, and the priority information is updated by increasing the priorities of the remaining encoding units 103c by one each. However, if the component conversion unit 103a is operating in the conversion mode 2 and the transfer request output to the memory I/F unit 105 is a transfer request regarding a particular pixel plane, the priority information is not changed until the number of times the transfer request was output satisfies a condition. In other words, the priority for the transfer request for a particular pixel plane is not lowered until the number of times the transfer request was output satisfies a condition.

When the priority information is updated in step S307, the output rate control unit 103d ends the processing. As described above, the output rate control operation shown in FIG. 3 is repeatedly executed. Although there is no limitation on the frequency or cycle of the repetition, the output rate control operation can be executed every time the transfer processing granted by the memory I/F unit 105 is completed, or can be executed every fixed period.

A specific example of the output rate control described using FIG. 3 will be described using timing charts shown in FIGS. 4A and 4B. Reference signs C1 to C4 indicate pixel planes, and reference signs p1 to p4 indicate priorities in the priority information. The smaller the value is, the higher the priority is, and p1 has the highest priority. Reference signs T1 to T5 indicate times at which the output rate control unit 103d executes the processing of FIG. 3, outputs the transfer request to the memory I/F unit 105, or updates the priority information.

Figure 4A:
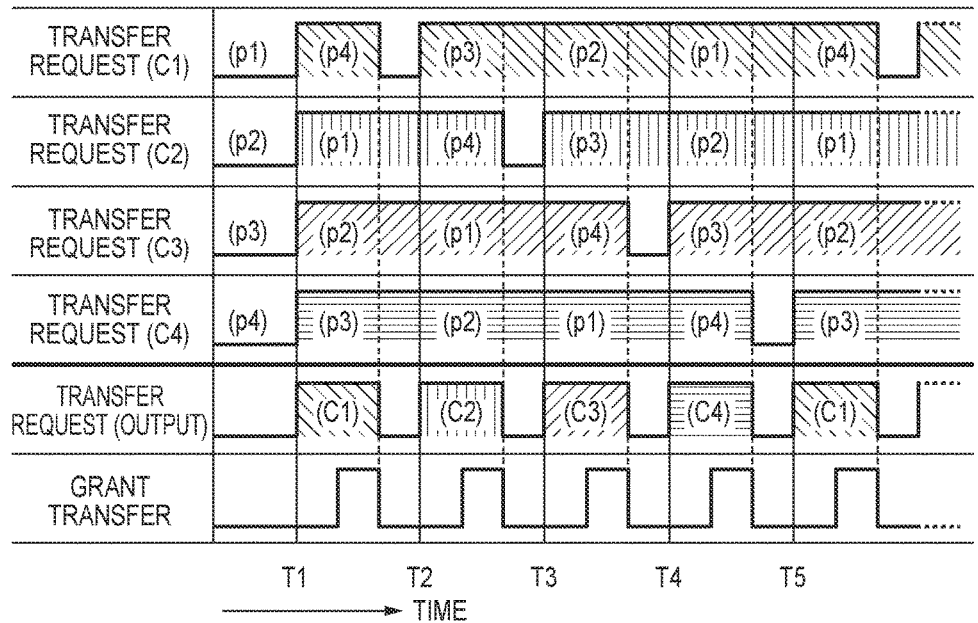
FIGS. 4A and 4B are timing charts showing examples of the control of output rates in the first embodiment.

FIG. 4A shows an example in which the component conversion unit 103a is operating in the conversion mode 1, and the pixel planes and the priorities are associated with each other as follows in the priority information in an initial state, for example.

(C1, C2, C3, C4)=(p1, p2, p3, p4)

Also, the encoding units 103c have encoded data that is to be transferred at T1, and output transfer requests.

At T1, based on the priority information, the output rate control unit 103d outputs the transfer request for the pixel plane C1 among the transfer requests from the encoding units 103c to the memory I/F unit 105. Also, the output rate control unit 103d changes the priority of the pixel plane C1 for which the transfer request has been output, to the lowest, and updates the priority information by increasing the priorities of the other pixel planes by one each. The priority information after the update is as follows.

(C1, C2, C3, C4)=(p4, p1, p2, p3)

If the memory I/F unit 105 grants transfer permission for the transfer request output at T1, the encoded data of the pixel plane C1 is written to the memory 104 from the corresponding encoding unit 103*c*, via the output rate control unit 103*d* and the memory I/F unit 105. This writing can be performed by the encoding unit 103*c*. When the transfer granted time period ends, the writing of the encoded data of the pixel plane C1 ends, and the output of the transfer request from the encoding unit 103*c* corresponding to the pixel plane C1 and the output of the transfer request from the output rate control unit 103*d* also end.

At T2, the transfer request is again output from the encoding unit 103*c* corresponding to the pixel plane C1, and the output rate control unit 103*d* receives four transfer requests including the transfer requests from the encoding units 103*c* corresponding to the pixel planes C2 to C4 that continue to have been received from T1. Based on the priority information, the output rate control unit 103*d* outputs the transfer request for the pixel plane C2 to the memory I/F unit 105 at T2. Furthermore, the output rate control unit 103*d* changes the priority of the pixel plane C2 for which the transfer request has been output, to the lowest, and updates the priority information by increasing the priorities of the other pixel planes by one each. The priority information after the update is as follows.

(C1, C2, C3, C4)=(p3, p4, p1, p2)

When the memory I/F unit 105 grants transfer permission for the transfer request output at T2, the encoded data of the pixel plane C2 is written to the memory 104 from the corresponding encoding unit 103*c*, via the output rate control unit 103*d* and the memory I/F unit 105. When the transfer granted time period ends, the writing of the encoded data of the pixel plane C2 ends, and the output of the transfer request from the encoding unit 103*c* corresponding to the pixel plane C2 and the output of the transfer request from the output rate control unit 103*d* also end.

At T3, the transfer request is again output from the encoding unit 103*c* corresponding to the pixel plane C2, and the output rate control unit 103*d* receives four transfer requests including the transfer requests from the encoding units 103*c* corresponding to the other pixel planes C1, and C3 to C4 that continue to have been received. Based on the priority information, the output rate control unit 103*d* outputs the transfer request for the pixel plane C3 to the memory I/F unit 105 at T3. Furthermore, the output rate control unit 103*d* changes the priority of the pixel plane C3 for which the transfer request has been output, to the lowest, and updates the priority information by increasing the priorities of the other pixel planes by one each. The priority information after the update is as follows.

(C1, C2, C3, C4)=(p2, p3, p4, p1)

Hereinafter, similarly, at T4, the output rate control unit 103*d* outputs the transfer request for the pixel plane C4 to the memory I/F unit 105, and updates the priority information as follows.

(C1, C2, C3, C4)=(p1, p2, p3, p4)

Furthermore, at T5, the output rate control unit 103*d* outputs the transfer requests for the pixel plane C1 to the memory I/F unit 105, and updates the priority information as follows.

(C1, C2, C3, C4)=(p4, p1, p2, p3)

The output rate control unit 103*d* repeats similar processing thereafter.

As described above, if the component conversion unit 103*a* is operating in the conversion mode 1, encode amount control is executed so as to uniformize the encode amounts that the encoding units 103*c* generate for the pixel planes (R, G1, G2, and B). Therefore, the output rate control unit 103*d* updates the priority information (changes the priorities of the encoding units 103*c* or the pixel planes) so as to give equal chances for transferring encoded data to the encoding units 103*c*. Doing this makes it possible to realize the control such that the time periods during which the encoding units 103*c* are granted transfer are equalized, and the rates for outputting the encoded data to the pixel planes are equal to each other.

Figure 4B:
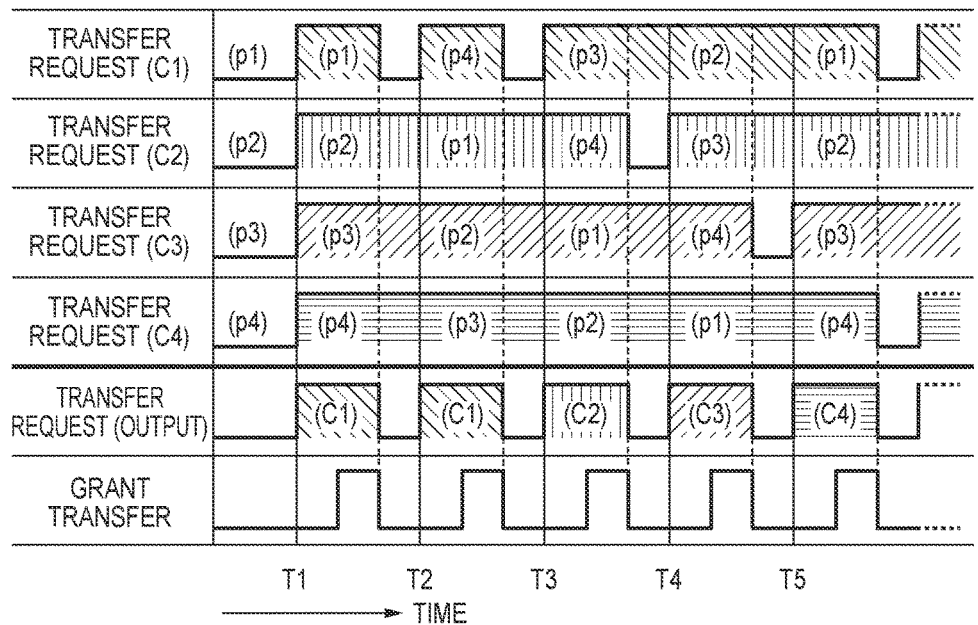

FIG. 4B shows an example in which the component conversion unit 103*a* is operating in the conversion mode 2, and the pixel planes and the priorities are associated with each other as follows in the priority information in an initial state, for example.

(C1, C2, C3, C4)=(p1, p2, p3, p4)

Also, the encoding units 103*c* output the transfer requests at T1 at the same time. Furthermore, it is assumed that N=2 is set.

At T1, based on the priority information, the output rate control unit 103*d* outputs the pixel plane C1 transfer request among the transfer requests from the encoding units 103*c* to the memory I/F unit 105. Also, since the output rate control unit 103*d* outputs the transfer request for the pixel plane C1, the output rate control unit 103*d* increments the counter rcnt. Because the counter rcnt is 1 at this time, the output rate control unit 103*d* does not update the priority information.

If the memory I/F unit 105 grants transfer permission for the transfer request output at T1, the encoded data of the pixel plane C1 is written to the memory 104 from the corresponding encoding unit 103*c*, via the output rate control unit 103*d* and the memory I/F unit 105. When the transfer granted time period ends, the writing of the encoded data of the pixel plane C1 ends, and the output of the transfer request from the encoding unit 103*c* corresponding to the pixel plane C1 and the output of the transfer request from the output rate control unit 103*d* end.

At T2, the transfer request is again output from the encoding unit 103*c* corresponding to the pixel plane C1, and the output rate control unit 103*d* receives four transfer requests including the transfer requests from the encoding units 103*c* corresponding to the pixel planes C2 to C4 that continue to have been received from T1. Because the priority information has not been updated at T1, at T2 as well, based on the priority information, the output rate control unit 103*d* outputs the transfer request for the pixel plane C1 to the memory I/F unit 105. Also, since the output rate control unit 103*d* outputs the transfer request for the pixel plane C1, the output rate control unit 103*d* increments the counter rcnt. Because the counter rcnt is 2 at this time and the condition rcnt≥N is satisfied, the output rate control unit 103*d* updates the priority information.

The output rate control unit 103*d* changes the priority of the pixel plane C2 for which the transfer request has been output to the lowest, and updates the priority information by increasing the priorities of the other pixel planes by one each. The priority information after the update is as follows.

(C1, C2, C3, C4)=(p4, p1, p2, p3)

The operations of the output rate control unit 103*d* from T3 to T5 are the same as the operations from T2 to T4 in the case where the component conversion unit 103*a* is operating in the conversion mode 1, which has been described with reference to FIG. 4A, and therefore, the description thereof is omitted.

As described above, if the component conversion unit 103*a* is operating in the conversion mode 2, encode amount control is executed such that a generated encode amount larger than the other pixel planes are granted for the pixel plane C1 containing a large amount of the luminance component having a high visual importance. Therefore, the output rate control unit 103d updates the priority information such that the encoding unit 103c corresponding to the pixel plane C1 is granted permission to transfer encoded data for a longer time period than the encoding units 103c corresponding to the other pixel planes (granted permission to transfer the encoded data with a higher frequency).

Specifically, the priority information is updated such that the frequency with which the encoding unit 103c corresponding to the pixel plane C1 (or the pixel plane C1) has the highest priority is higher than the frequency with which the encoding units corresponding to the other pixel planes (or the other pixel planes) have the highest priority. For example, as described here, not updating the priority information can keep a state in which the encoding unit 103c (or the pixel plane C1) corresponding to the pixel plane C1 has the highest priority. Alternatively, the priority information may be updated such that a cycle at which the encoding unit 103c (or the pixel plane C1) corresponding to the pixel plane C1 has the highest priority is shorter than the cycle at which the encoding units 103c (or the pixel planes) corresponding to the other pixel planes have the highest priority.

Note that because the encoded data amounts allocated to the pixel planes C2 to C4 are the same here, an example is shown in which control is performed such that the rates of outputting the pixel planes C2 to C4 are equalized. However, control may be performed such that the rate of outputting the data obtained by encoding at least one of the pixel planes C2 to C4 differs from the rate of outputting the data obtained by encoding the other pixel planes.

In the present embodiment, the output rates of the encoding units can be dynamically controlled by controlling the output rates of the encoding units in accordance with the conversion mode in which the component conversion unit is operating, or in accordance with the encoded data amounts allocated to the encoding units. Furthermore, the time period for which the encoding unit is granted permission to transfer data can be dynamically controlled in accordance with the operation mode of the component conversion unit, or the encoded data amounts allocated to the encoding units. Therefore, even if the relationship between encoded data amounts generated in the plurality of encoding units dynamically changes, an output rate appropriate for the individual encoding unit can be realized, and the bandwidth of the data bus that is a shared resource can be efficiently utilized. Therefore, it is possible to effectively use the capabilities of the encoding units and improve the throughput of the encoding processing.

Second Embodiment

Next, a second embodiment will be described. In the first embodiment, the generated encode amounts of the encoding units 103c are controlled, and the output rate control unit 103d knows the relationship of the generated encode amounts between the encoding units 103c. The present embodiment relates to output rate control in the case where the output rate control unit 103d does not know the relationship of the generated encode amounts between the encoding units 103c (or in the case where the relationship between the generated encode amounts is not used). Hereinafter, differences from the first embodiment will be described.

Figure 5:
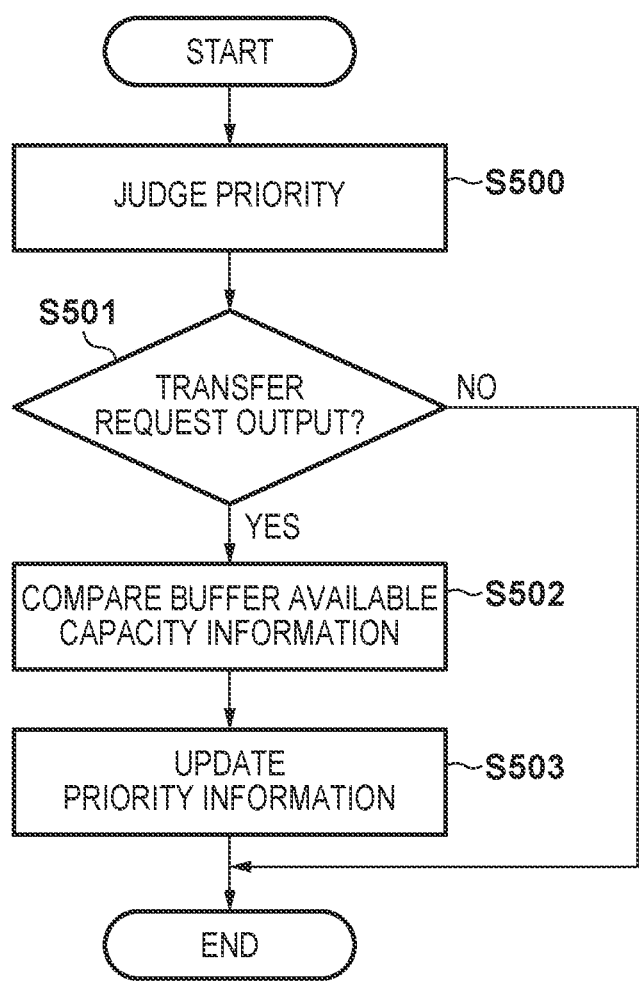
FIG. 5 is a flowchart for illustrating the control of an output rate in a second embodiment.

In the present embodiment, the output rate control unit 103d updates the priorities of the pixel planes (or the encoding units) based on the available capacities of the corresponding buffers 103b, and performs the control of the rate of outputting encoded data. FIG. 5 is a flowchart showing the output rate control operation (priority information update operation) performed by the output rate control unit 103d in the present embodiment.

First, the output rate control unit 103d judges the priority of the transfer request that has been input by the encoding unit 103c, based on the priority information (step S500). Here, if there are no transfer requests whose priority needs to be judged, the output rate control unit 103d ends the processing (step S501, NO). On the other hand, if there is a transfer request whose priority needs to be judged, the output rate control unit 103d outputs the transfer request that has been judged to have the highest priority among the transfer requests, to the memory I/F unit 105 (step S501, YES), and advances the processing to step S502.

The output rate control unit 103d compares the available capacities of the buffers 103b in step S502. As described above, the component conversion unit 103a monitors the available capacities of the buffers 103b, and notifies the output rate control unit 103d of the available capacities. The available capacity may be expressed in any format such as the number of bytes of free space, the ratio of free space to the total space, or the like.

It is conceivable that if there is a buffer whose available capacity is less than the other buffers, processing for encoding the pixel plane corresponding to the buffer will be delayed compared to the processing for encoding the other pixel planes, and the output of the encoded data will be waited for. Therefore, in step S503, the output rate control unit 103d updates the priority information such that the priority of the pixel plane corresponding to the buffer having the smallest available capacity is the highest. The output rate control in the present embodiment is independent of the conversion mode in which the component conversion unit 103a is operating.

The output rate control unit 103d repeats the above-described processing. In this manner, the output rate control unit 103d of the present embodiment realizes the control of an appropriate output rate by prioritizing output of the transfer request from the encoding unit 103c corresponding to the buffer having a lower available capacity to the memory I/F unit 105.

Figure 6:
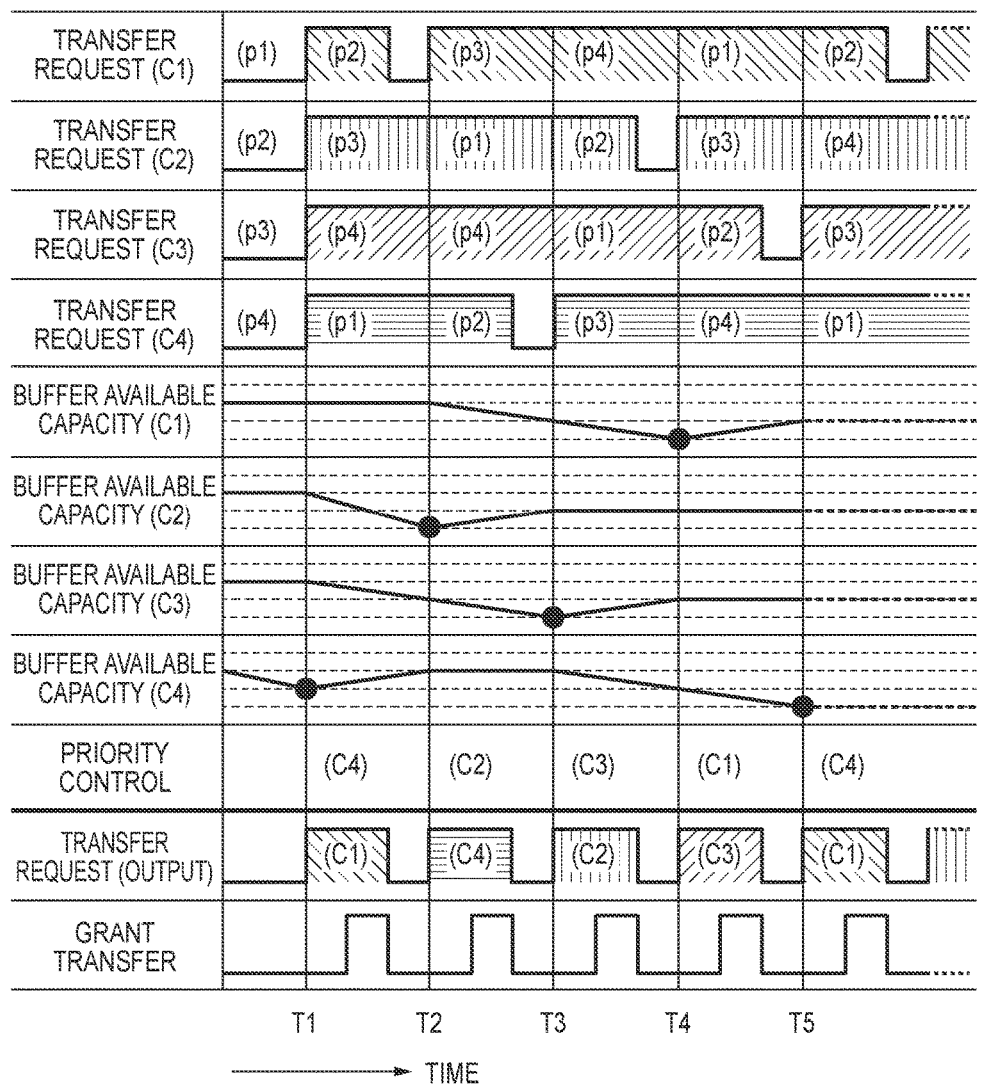
FIG. 6 is a timing chart showing an example of the control of the output rate in the second embodiment.

FIG. 6 is a timing chart schematically showing a specific example of the output rate control in the present embodiment in a form similar to FIGS. 4A and 4B. Reference signs C1 to C4 indicate pixel planes, and reference signs p1 to p4 indicate priorities in the priority information. The smaller the value is, the higher the priority is, and p1 has the highest priority. Reference signs T1 to T5 indicate times at which the output rate control unit 103d executes the processing of FIG. 3, outputs the transfer request to the memory I/F unit 105, or updates the priority information. FIGS. 4A and 4B additionally show change over time in the available capacities of the buffers 103b corresponding to the pixel planes C1 to C4.

The pixel planes and the priorities are associated with each other as follows in the priority information in an initial state, for example.

(C1, C2, C3, C4)=(p1, p2, p3, p4)

Also, the encoding units 103c have encoded data that is to be transferred at T1, and outputs the transfer requests.

At T1, based on the priority information, the output rate control unit 103d outputs the transfer request for the pixel plane C1 among the transfer requests from the encoding units 103c to the memory I/F unit 105. Also, the output rate control unit 103d compares the available capacities of the buffers 103b, changes the priority of the pixel plane C4 having the smallest available capacity to the highest, and updates the priority information by lowering the priorities of the other pixel planes by one each. The priority information after the update is as follows. Note that priority may be assigned in order from the smallest available capacity.

(C1, C2, C3, C4)=(p2, p3, p4, p1)

When the memory I/F unit 105 grants permission for the transfer request output at T1, the encoded data of the pixel plane C1 is written to the memory 104 from the corresponding encoding unit 103c, via the output rate control unit 103d and the memory I/F unit 105. When the transfer granted time period ends, the writing of the encoded data of the pixel plane C1 ends, and the output of the transfer request from the encoding unit 103c corresponding to the pixel plane C1 and the output of the transfer request from the output rate control unit 103d end.

At T2, the transfer request is again output from the encoding unit 103c corresponding to the pixel plane C1, and the output rate control unit 103d receives four transfer requests including the transfer requests from the encoding units 103c corresponding to the pixel planes C2 to C4 that continue to have been received from T1. Based on the priority information, the output rate control unit 103d outputs the transfer request for the pixel plane C4 to the memory I/F unit 105 at T2. Also, the output rate control unit 103d compares the available capacities of the buffers 103b, changes the priority of the pixel plane C2 having the smallest available capacity to the highest, and updates the priority information by lowering the priorities of the other pixel planes by one each. Note that the priority of the pixel plane C3 already having the lowest priority does not change. The priority information after the update is as follows.

(C1, C2, C3, C4)=(p3, p1, p4, p2)

Then, similarly to the case of time T1, the encoded data of the pixel plane C4 is written to the memory 104.

At T3, based on the priority information, the output rate control unit 103d outputs the transfer request for the pixel plane C2 to the memory I/F unit 105. Also, the output rate control unit 103d compares the available capacities of the buffers 103b, changes the priority of the pixel plane C3 having the smallest available capacity to the highest, and updates the priority information by lowering the priorities of the other pixel planes by one each. The priority information after the update is as follows.

(C1, C2, C3, C4)=(p4, p2, p1, p3)

Then, similarly to the case of time T1, the encoded data of the pixel plane C2 is written to the memory 104.

Similarly, at T4, based on the priority information, the output rate control unit 103d outputs the transfer request for the pixel plane C3 to the memory I/F unit 105. Also, the output rate control unit 103d changes the priority of the pixel plane C1 having the smallest available capacity of the buffer to the highest, and updates the priority information by lowering the priorities of the other pixel planes by one each. The priority information after the update is as follows.

(C1, C2, C3, C4)=(p1, p3, p2, p4)

Then, similarly to the case of time T1, the encoded data of the pixel plane C3 is written to the memory 104.

Similarly, at T5 as well, based on the priority information, the output rate control unit 103d outputs the transfer request for the pixel plane C1 to the memory I/F unit 105. Also, the output rate control unit 103d changes the priority of the pixel plane C4 having the smallest available capacity of the buffer to the highest, and updates the priority information by lowering the priorities of the other pixel planes by one each. The priority information after the update is as follows.

(C1, C2, C3, C4)=(p2, p4, p3, p1)

Then, similarly to the case of time T1, the encoded data of the pixel plane C1 is written to the memory 104.

Thereafter, similar processing is repeated.

In this manner, according to the present embodiment, the output rates of the encoding units are controlled in accordance with the available capacities or free space of the buffers that are to store the pixel planes, and thus the output rates of the encoding units can be dynamically controlled. Furthermore, it is possible to periodically compare the available capacities or the free space of the buffers that are to store the pixel planes, and increase the transfer request priority of the encoding unit corresponding to the buffer having a smaller available capacity or less free space compared to the transfer request priorities of the other encoding units. Accordingly, the time period for which data transfer is granted for the encoding unit that has a large generated encode amount or will need to be waited for to transfer encoded data is set longer than in the other encoding units, and appropriate output rate control can be realized. Therefore, even if the relationship between encoded data amounts generated in the plurality of encoding units changes, an output rate appropriate for the individual encoding unit can be realized, and the bandwidth of the data bus that is a shared resource can be efficiently utilized. Therefore, it is possible to effectively use the capabilities of the encoding units and improve the throughput of the encoding processing.

Third Embodiment

Next, a third embodiment will be described. The third embodiment is a combination of the output rate control of the first embodiment and the output rate control of the second embodiment. After updating priority information in accordance with the conversion mode in which the component conversion unit 103a is operating, an output rate control unit 103d of the present embodiment further changes the priority information in accordance with the available capacities or free space of the buffers.

The operations of the output rate control unit 103d of the present embodiment will be described using a flowchart shown in FIG. 7. Note that in FIG. 7, the same reference numerals are given in processing steps similar to those in FIGS. 3 and 5, and the description thereof is omitted.

Figure 7:
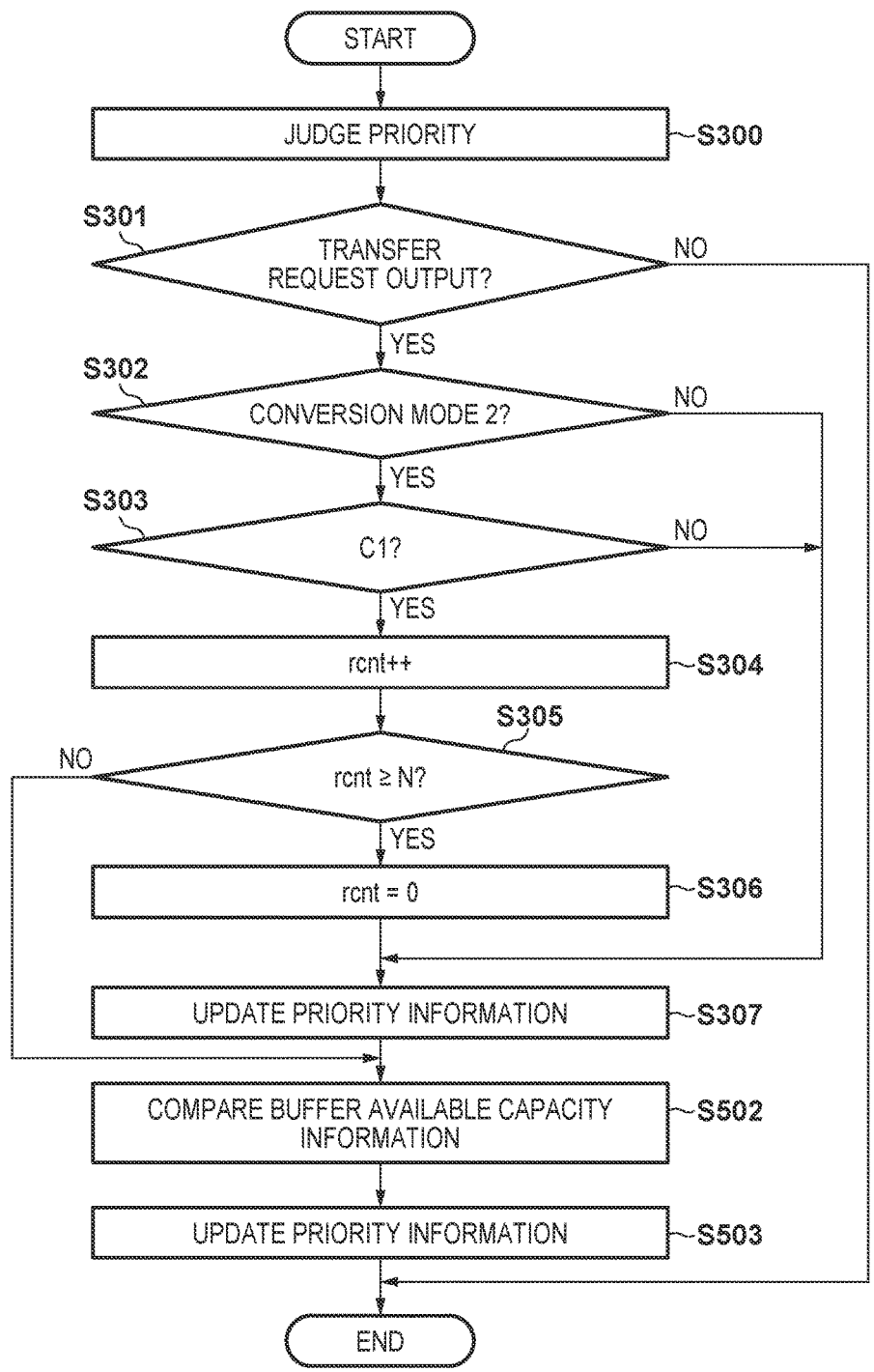
FIG. 7 is a flowchart for illustrating the control of an output rate in a third embodiment.
Figure 8:
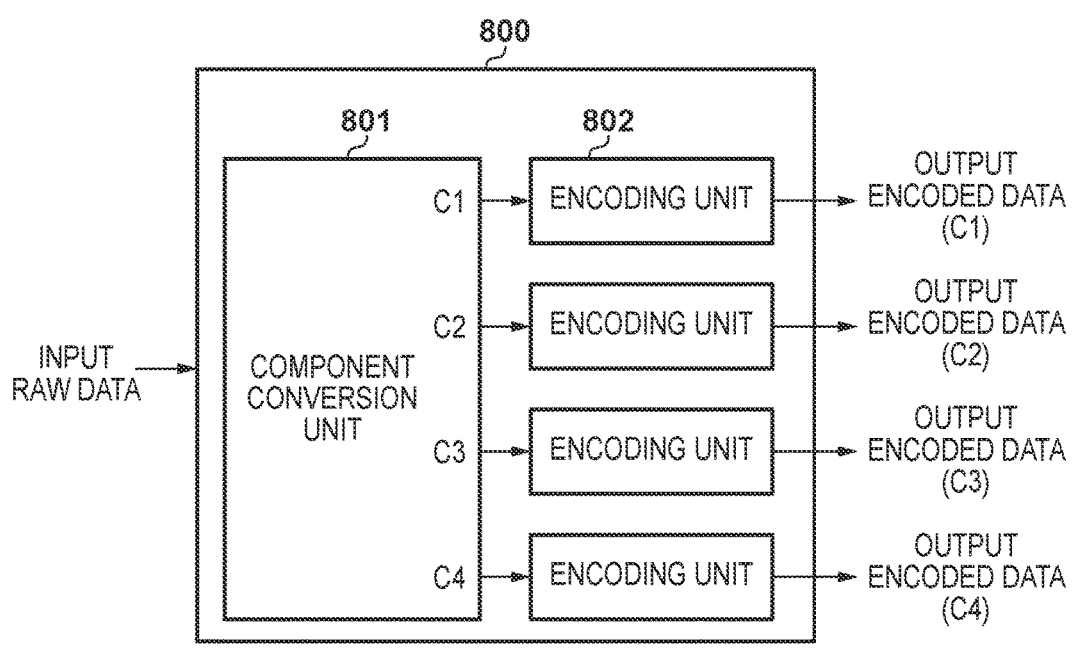
FIG. 8 is a block diagram showing a configuration example of a conventional encoder.

As shown in FIG. 7, similarly to the first embodiment, first, the output rate control unit 103d judges the priority, outputs a transfer request, and performs processing for updating the priorities (steps S301 to S307). Subsequently, the output rate control unit 103d compares the available capacities of the buffers that have been received from the component conversion unit 103a (step S502). Then, the output rate control unit 103d changes the priority of the pixel plane having the smallest available capacity (or the corresponding encoding unit) to the highest, and updates the priority information by lowering the priorities of the other pixel planes by one each (step S503).

In the present embodiment, output rate control in accordance with the conversion mode in which the component conversion unit is operating or encoded data amounts allocated to the encoding units is combined with output rate control in accordance with the available capacities or free space of the buffers. Thus, in addition to the effect of the first embodiment, the effect of allowing appropriate output rate control can be realized even in the case where variation in the generated encode amounts of the encoding units occurs.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-214806, filed on Oct. 30, 2015, which is hereby incorporated by reference herein in its entirety.

What is claimed is:

1. An image processing apparatus comprising:
   a converter that converts image data to a plurality of pixel planes;
   a plurality of first memories that respectively store one of the plurality of pixel planes;
   a plurality of encoders that respectively encode a pixel plane stored in a corresponding one of the plurality of first memories;
   a rate controller that controls output rates from the plurality of encoders to a second memory; and
   an access controller that grants an access request for access to the second memory,
   wherein the rate controller controls the output rates by controlling an access request that is to be output to the access controller among access requests to the second memory from the plurality of encoders, in accordance with a conversion mode of the converter and/or available capacities of the first memories, and
   wherein the rate controller controls the output rates such that in a case where the conversion mode is a second conversion mode, the output rate of an encoder, which is one of the plurality of encoders and which encodes a particular pixel plane, is larger than in a case where the conversion mode is a first conversion mode.

2. The image processing apparatus according to claim 1, wherein the converter converts the image data to a red pixel plane, a green pixel plane, and a blue pixel plane in the first conversion mode, and converts the image data to a luminance component pixel plane and a color difference component pixel plane in the second conversion mode.

3. The image processing apparatus according to claim 2, wherein the particular pixel plane is the luminance component pixel plane.

4. The image processing apparatus according to claim 1, wherein the rate controller prioritizes output of the access request to the access controller from the encoder corresponding to a first memory having a smallest available capacity among the plurality of first memories.

5. The image processing apparatus according to claim 1, wherein the rate controller periodically outputs, to the access controller, one of the access requests to the second memory from the plurality of encoders.

6. The image processing apparatus according to claim 1, wherein the image data is RAW data having a primary color Bayer pattern.

7. An image capture apparatus comprising:
   an image sensor;
   a converter that converts image data obtained by the image sensor to a plurality of pixel planes;
   a plurality of first memories that respectively store one of the plurality of pixel planes;
   a plurality of encoders that respectively encode a pixel plane stored in a corresponding one of the plurality of first memories;
   a rate controller that controls output rates from the plurality of encoders to a second memory; and
   an access controller that grants an access request for access to the second memory,
   wherein the rate controller controls the output rates by controlling an access request that is to be output to the access controller among access requests to the second memory from the plurality of encoders, in accordance with a conversion mode of the converter and/or available capacities of the first memories, and
   wherein the rate controller controls the output rates such that in a case where the conversion mode is a second conversion mode, the output rate of an encoder, which is one of the plurality of encoders and which encodes a particular pixel plane, is larger than in a case where the conversion mode is a first conversion mode.

8. An image processing method executed by an image processing apparatus that comprises (a) a converter that converts image data to a plurality of pixel planes, (b) a plurality of first memories that respectively store one of the plurality of pixel planes, (c) a plurality of encoders that respectively encode a pixel plane stored in a corresponding one of the plurality of first memories, (d) a second memory shared by the plurality of encoders, and (e) an access controller that grants an access request for access to the second memory, the method comprising:
   controlling the output rates from the plurality of encoders to the second memory, by controlling an access request that is to be output to the access controller among access requests to the second memory from the plurality of encoders, in accordance with a conversion mode of the converter and/or available capacities of the first memories,
   wherein in the controlling, the output rates are controlled such that in a case where the conversion mode is a second conversion mode, the output rate of an encoder, which is one of the plurality of encoders and which encodes a particular pixel plane, is larger than in a case where the conversion mode is a first conversion mode.

9. A non-transitory computer-readable storage medium storing a program for causing a computer to function as an image processing apparatus comprising:

a converter that converts image data to a plurality of pixel planes;

a plurality of first memories that respectively store one of the plurality of pixel planes;

a plurality of encoders that respectively encode a pixel plane stored in a corresponding one of the plurality of first memories;

a rate controller that controls output rates from the plurality of encoders to a second memory; and an access controller that grants an access request for access to the second memory, wherein the rate controller controls the output rates by controlling an access request that is to be output to the access controller among access requests to the second memory from the plurality of encoders, in accordance with a conversion mode of the converter and/or available capacities of the first memories, and wherein the rate controller controls the output rates such that in a case where the conversion mode is a second conversion mode, the output rate of an encoder, which is one of the plurality of encoders and which encodes a particular pixel plane, is larger than in a case where the conversion mode is a first conversion mode.

* * * * *